US009052840B2

(12) United States Patent
Cordero et al.

(10) Patent No.: US 9,052,840 B2
(45) Date of Patent: Jun. 9, 2015

(54) ACCESSING ADDITIONAL MEMORY SPACE WITH MULTIPLE PROCESSORS (71) Applicant: International Business Machines Corporation, Armonk, NY (US)

(72) Inventors: Edgar R. Cordero, Round Rock, TX (US); Anand Haridass, Bangalore (IN); Diyanesh B. Vidyapoornachary, Bangalore (IN); Robert B. Tremaine, Stormville, NY (US)

(73) Assignee: International Business Machines Corporation, Armonk, NY (US)

(*) Notice: Subject to any disclaimer, the term of this patent is extended or adjusted under 35 U.S.C. 154(b) by 152 days.

(21) Appl. No.: 13/782,143

(22) Filed: Mar. 1, 2013

(65) Prior Publication Data

US 2014/0143510 A1 May 22, 2014

Related U.S. Application Data (63) Continuation of application No. 13/679,496, filed on Nov. 16, 2012.

(51) Int. Cl.
*G06F 12/02* (2006.01)
*G06F 3/06* (2006.01)
*G06F 9/50* (2006.01)

(52) U.S. Cl.
CPC ............ *G06F 3/067* (2013.01); *G06F 12/0284* (2013.01); *G06F 9/5083* (2013.01)

(58) Field of Classification Search
CPC ....... G06F 9/544; G06F 3/067; G06F 9/5083; G06F 12/0284
See application file for complete search history.

(56) References Cited

U.S. PATENT DOCUMENTS

| | | | | |
|---|---|---|---|---|
| 5,274,782 A | * | 12/1993 | Chalasani et al. | 710/317 |
| 5,910,928 A | * | 6/1999 | Joffe | 365/230.05 |
| 5,996,042 A | * | 11/1999 | Pawlowski et al. | 711/105 |
| 6,032,234 A | * | 2/2000 | Kishi | 711/156 |
| 6,434,688 B1 | | 8/2002 | Rhoden et al. | |
| 6,504,785 B1 | * | 1/2003 | Rao | 365/230.05 |
| 6,856,320 B1 | | 2/2005 | Rubenstein et al. | |
| 7,149,863 B1 | * | 12/2006 | Chew et al. | 711/170 |
| 7,797,496 B2 | | 9/2010 | Gruber et al. | |
| 7,984,261 B2 | * | 7/2011 | Park et al. | 711/170 |
| 2002/0093505 A1 | * | 7/2002 | Hill et al. | 345/543 |
| 2003/0037178 A1 | | 2/2003 | Vessey et al. | |
| 2004/0205304 A1 | * | 10/2004 | McKenney et al. | 711/148 |
| 2005/0193081 A1 | * | 9/2005 | Gruber et al. | 709/212 |
| 2006/0161755 A1 | * | 7/2006 | Uchikawa et al. | 711/170 |
| 2007/0208902 A1 | | 9/2007 | Park et al. | |
| 2008/0140960 A1 | * | 6/2008 | Basler et al. | 711/162 |

(Continued)

*Primary Examiner* — Hiep Nguyen
(74) *Attorney, Agent, or Firm* — Scott A. Berger; Robert R. Williams (57) ABSTRACT

An apparatus and method is provided for coupling additional memory to a plurality of processors. The method may include determining the memory requirements of the plurality of processors in a system, comparing the memory requirements of the plurality of processors to an available memory assigned to each of the plurality of processors, and selecting a processor from the plurality of processors that requires additional memory capacity. The apparatus may include a plurality of processors, where the plurality of processors is coupled to a logic element. In addition, the apparatus may include an additional memory coupled to the logic element, where the logic element is adapted to select a processor from the plurality of processors to couple with the additional memory.

12 Claims, 10 Drawing Sheets

(56) References Cited

U.S. PATENT DOCUMENTS

| | | |
|---|---|---|
| 2008/0181021 A1 | 7/2008 | Thayer |
| 2009/0019237 A1 | 1/2009 | Kwon et al. |
| 2009/0228668 A1 | 9/2009 | Borkenhagen |
| 2010/0064087 A1* | 3/2010 | Wang .......................... 710/301 |
| 2011/0113115 A1* | 5/2011 | Chang et al. .................. 709/213 |
| 2011/0276972 A1 | 11/2011 | Chung et al. |
| 2012/0033978 A1 | 2/2012 | Morris et al. |
| 2012/0179880 A1 | 7/2012 | Ware et al. |
| 2013/0132506 A1* | 5/2013 | Morris .......................... 709/216 |
| 2013/0132587 A1* | 5/2013 | Morris .......................... 709/226 |

* cited by examiner

ACCESSING ADDITIONAL MEMORY SPACE WITH MULTIPLE PROCESSORS

CROSS-REFERENCE TO RELATED APPLICATIONS

This application is a continuation of co-pending U.S. patent application Ser. No. 13/679,496, filed Nov. 16, 2012. The aforementioned related patent application is herein incorporated by reference in its entirety.

TECHNICAL FIELD

Embodiments described herein generally relate to memory, and more specifically, to shared semi-conductor memory in a computer system.

BACKGROUND

In multiple processor configurations, available memory may be increased by adding more physical memory, which may add costs, or using hardware virtualization, which may affect system performance. Adding more physical memory may also result in resource waste, since the expanded physical memory may not be utilized at all times.

SUMMARY

Embodiments of the invention include methods and apparatus for a plurality of processors to select use of additional memory through a switching device or a logic element in order to increase the apparent size of the physical memory of the system.

One embodiment is directed to a method of coupling additional memory to a plurality of processors. The method may comprise determining the memory requirements of the plurality of processors in a system. In addition, the method may include comparing the memory requirements of the plurality of processors to an available memory assigned to each of the plurality of processors. Further, the method may include selecting a processor from the plurality of processors that requires additional memory capacity beyond the assigned available memory of the processor from the plurality of processors to couple to the additional memory.

Another embodiment is directed to an electronic device. The electronic device may include a plurality of processors, where the plurality of processors is coupled to a logic element. In addition, the electronic device may include an additional memory coupled to the logic element, where the logic element is adapted to select a processor from the plurality of processors to couple with the additional memory.

Another embodiment is directed to a switching device. The switching device may include a plurality of processors with the plurality of processors each coupled to the switching device. Further, the switching device may include an additional memory with the additional memory coupled to the switching device. In addition, the switching device may include a controller that is adapted to signal the switching device to couple the additional memory to a processor from the plurality of processors.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

In modern computer systems, such as servers, large amounts of memory are required. More memory is typically needed for multiple processor configurations which may increase performance but may also increase cost. For multiple processor configurations, the likelihood that all memory is demanded simultaneously may be small and unused memory may become idle which wastes resources. An aspect of the mentioned disclosure is the ability to share memory between processors which results in higher usage of the memory and lower costs.

Features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments may be practiced and to further enable those of skill in the art to practice the invention. It is also to be understood that the descriptions of the embodiments are provided by way of example only, and are not intended to limit the scope of this invention as claimed.

Figure 1:
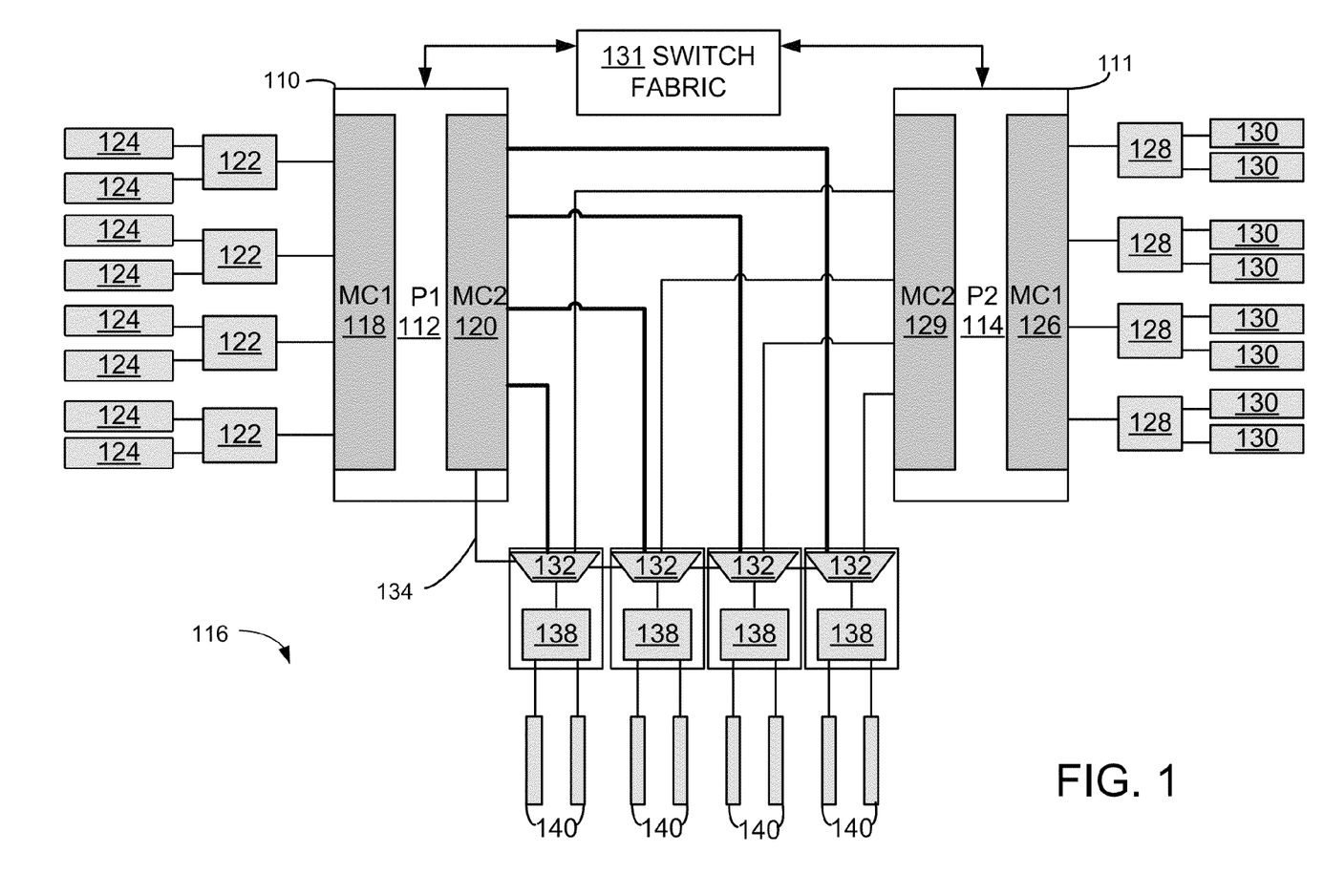
FIG. 1 shows a schematic representation of a top view of a single chip module with additional memory access implemented by a switching device according to an embodiment.

FIG. 1 is a Single Chip Module embodiment of an electronic device. For illustrative purposes, there may be two processor assemblies, a first processor assembly 110 and a second processor assembly 111 mounted on a circuit board 116 but the embodiment may have more than two processor assemblies and may have a quad processor arrangement. The first processor assembly 110 may have a first processor 112 and least one memory controller. In the shown embodiment, there may be two memory controllers, a first memory controller 118 and a second memory controller 120, mounted on a processor assembly 110.

The first memory controller 118 may connect to a first memory buffer 122. The memory buffer 122 may hold data in storage before transmitting the data to the memory modules 124. The memory buffer 122 may also retrieve data from the memory modules 124 upon a request from the first memory controller 118. In the shown embodiment, there are four first memory buffers 122 each connected to two memory modules 124. In the shown embodiment, the memory modules 124 are Dual In Line Memory Modules (DIMMs) but may be Single Inline Memory Modules, flash memory, DRAM, SRAM or any other memory device.

The second processor assembly 111, may have a similar structure to the first processor assembly 110. In the shown embodiment, the second processor assembly 111 has a second processor 114, a first memory controller 126, and a second memory controller 129. The first memory controller 126 is connected to a first memory buffer 128 which is connected in a similar manner as in the first processor assembly 110. Memory modules 130 may be connected to the first memory buffers 128 in a similar manner as in the first processor assembly 110.

The second memory controller 120 on the first processor assembly 110 and the second memory controller 129 on the second processor assembly 111 may be coupled to an input on a switching device 132. The switching device 132 may select between any input upon receiving a selector signal such as a selector signal 134 from the first processor 112. The switching device 132 may be referred to generally as a logic element or specifically as a multiplexer. The switching device 132 may be a multiplexer (MUX) but other configurations are contemplated such as a software-implemented controller. In the shown embodiment, the switching device 132 is a two-to-one MUX but other configurations are contemplated. The number of inputs on the MUX 132 may increase with the number of processors. For example, if four processors are used, the embodiment may have a four-to-one MUX 132. For purposes of illustration, the term MUX may be used interchangeably with the term switching device for discussion of FIG. 1 and FIG. 2. The switching device 132 may receive inputs from both second memory controllers. In the shown embodiment, the MUX 132 may use digital logic to ensure that both second memory controllers are not accessing the additional memory simultaneously.

Each switching device 132 may be further connected to an additional memory buffer 138. The additional memory buffer 138 is further connected to additional memory modules 140 in a similar manner as in the first memory buffer 122. The additional memory modules 140 may also be referred to as shared memory or additional memory. The additional memory modules 140 operate in a similar manner to memory modules 124 and 130.

Before the additional memory is accessed, a particular processor may determine whether additional memory is required. For example, a first processor 112 may communicate to the first memory controller 118 to request memory storage. If the first memory controller 118 uses memory beyond a limit of a parameter such as memory availability, then the first processor 112 requests memory through the second memory controller 120.

The processors, 112, 114, may be coupled to a switch fabric 131. The switch fabric 131 may coordinate the requests for the additional resources, such as additional memory 140, between the first processor 112 and the second processor 114. The switch fabric 131 may perform both switching and logic functions. For example, if the first processor 112 is attempting to access the additional memory 140 while the second processor 114 has control of the memory, then the first processor 112 may send a request signal through the switch fabric 131. The first processor 112 may wait for the second processor 114 to complete the use of the additional memory 140. If the use of the additional memory 140 is complete, the second processor 114 may signal the first processor 112 through the switch fabric 131 to activate a selector signal 134 and the MUX 132 may select the connection from the second memory controller 120. The first processor 112 may have exclusive use of the additional memory 140. The first processor 112 may limit the duration of the exclusive use based on parameter. The duration may be defined by, for example, time or usage of the additional memory. The parameters may include a time limit, a priority, a size, a utilization, or other parameter to ensure that the additional memory 140 is distributed evenly between the processors, 112, 114. The parameter may be predefined or created on-the-fly but other configurations are contemplated.

The additional memory may be selected in whole or in part by either second memory controller 120, 128. The additional memory 140 may act as an extension of memory from a second memory controller 120, 128 when selected. The second processor 114 may access the additional memory 140 in a similar fashion to the first processor 112.

Figure 2:
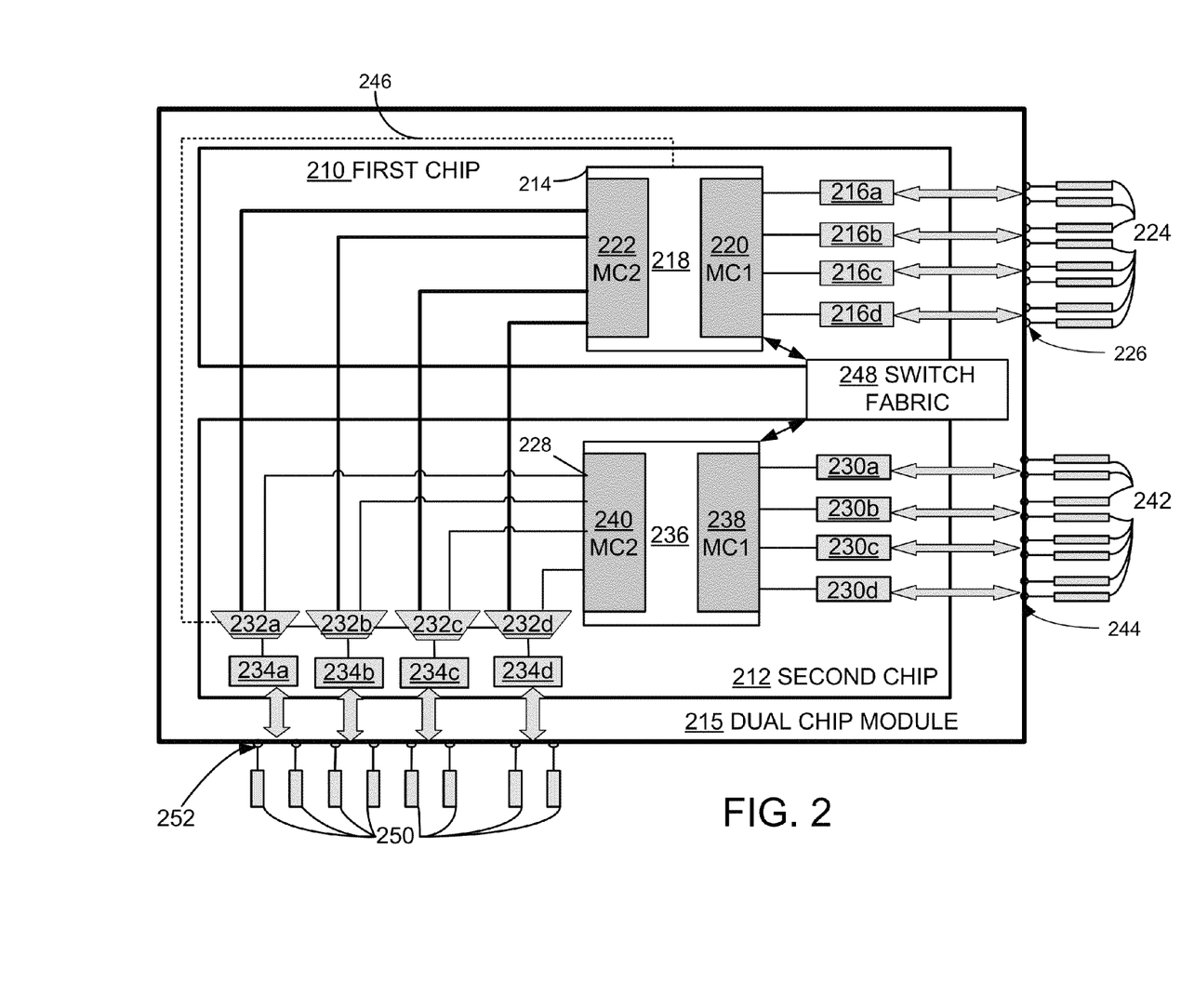
FIG. 2 shows a schematic representation of a top view of a dual chip module with additional memory access implemented by a switching device according to an embodiment.

FIG. 2 shows an electronic device in the Dual Chip Module configuration according to an embodiment. In the Dual Chip Module configuration, there may be two chips, a first chip 210 and a second chip 212, mounted on a Dual Chip Module 215. The first chip 210 may contain a first processor assembly 214 and memory buffers 216a, 216b, 216c, 216d. The first processor assembly 214 may further include a first processor 218, a first memory controller 220 and a second memory controller 222. The first memory controller 220 may couple to the memory buffer 216a, 216b, 216c, 216d on the first chip 210. The first processor assembly 214 functions in a similar manner to the first processor assembly 110 described in FIG. 1. The shown embodiment may have any number of chips mounted on a module such as four chips, or eight chips.

In the shown embodiment, there are four memory buffers, 216a, 216b, 216c, 216d but other configurations are contemplated. The memory buffers may be coupled with memory modules 224. In the shown embodiment, there are two memory modules 224 for every memory buffer 216 but other configurations are contemplated. The memory modules 224, in the shown embodiment, are DIMMs but other configurations are contemplated such as single in-line memory modules (SIMMs), flash memory, and other random access memory. The memory modules 224 may be located external to the dual chip module 215 and connect with package pins 226. The package pins 226 may further couple with the memory buffers 216.

The Dual Chip Module 215 may also contain a second chip 212. The second chip 212 may contain a second processor assembly 228, first memory buffers 230a, 230b, 230c, 230d, and MUXs 232a, 232b, 232c, 232d connected to second memory buffers 234a, 234b, 234c, 234d. The second memory buffers 234 may also be referred to as additional memory buffers. The second processor assembly 228 may have a second processor 236, a first memory controller 238 and a second memory controller 240. The first memory controller 238 on the second processor assembly 228 may be coupled to the first memory buffer 230a, 230b, 230c, 230d which may further be coupled to memory modules 242. The memory modules 242 may attach to pins 244 in a similar manner to the first chip 210.

The inputs on the MUX 232, may couple with the second memory controller 222 on the first processor assembly 214 and the second memory controller 240 on the second processor assembly 228. In the shown embodiment, the MUX 232a selector may be selected 246 by the first processor 218 but other configurations are contemplated. The MUX 232a, 232b, 232c, 232d selectors are shown coupled to the first processor 218, the second processor 236, and to each other for illustrative purposes. If more chips are used, then a different type of switching device 232 may be used. In the shown embodiment, the switching device 232 may be a two-to-one MUX 232 but an embodiment with four chips may have a four-to-one MUX 232.

It may also be possible for the MUX selectors 232 to be activated by an independent controller, the switch fabric 248, or one processor in a similar fashion to the embodiment on FIG. 1. The MUX 232 may be further coupled to a second memory buffer 234 on the second chip 212. The memory buffer 234 may couple with additional memory modules 250. The additional memory modules 250 may further connect to package pins 252 external to the Dual Chip Module 215. The connections in the shown embodiment are copper wire but other embodiments are contemplated such as direct soldering, Through Silicon Via, steel wire, or any other conductive connection.

The switch fabric 248 may handle coordination between the first processor 218 and the second processor 236 and may operate in a fashion similar to the embodiment on FIG. 1.

In the shown embodiment, the first memory controllers 220, 238, may operate in a reduced memory demand state. In the reduced memory demand state, the first memory controllers 220, 238 may adequately handle the memory load similar to the embodiment in FIG. 1. In an increased memory demand state, either the second memory controller 222 on the first processor assembly 214 or the second memory controller 240 on the second processor assembly 228 may be activated. Access to the additional memory modules 250 may be regulated by the MUX 232 in the increased memory demand state. The MUX 232 may prevent simultaneous usage of the additional memory by the second memory controllers from the first chip and the second chip. An increased memory demand may be in response to one or more parameters or may be activated by a user similar to the embodiment shown in FIG. 1. In the shown embodiment, the increase memory demand state may be in response to a decrease in the available memory of the first memory controller 220 but other parameters are contemplated such as a decrease in the available memory in both memory controllers 220, 238, a request from one processor, or request from a controller.

Figure 7:
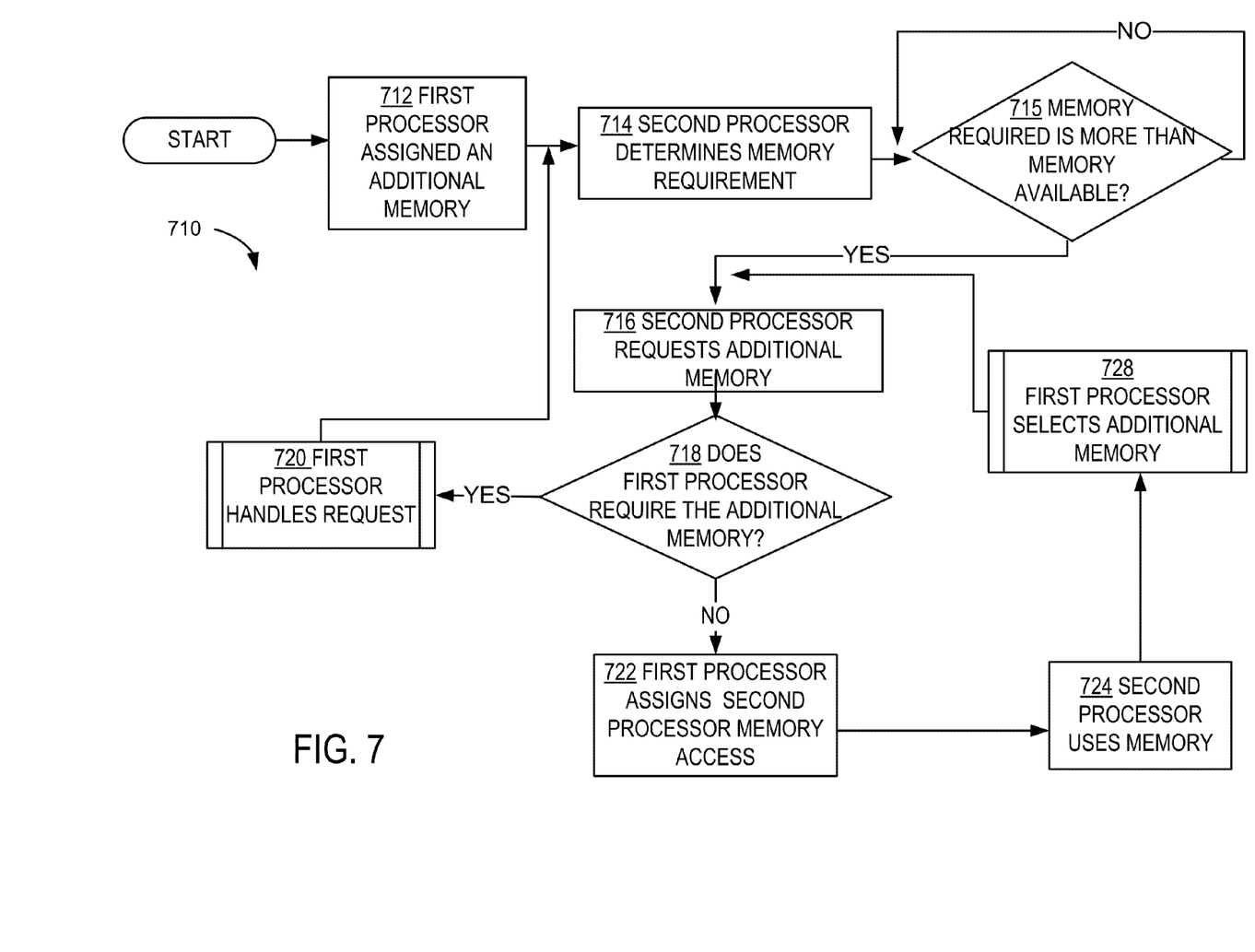
FIG. 7 shows a flowchart of the operation of the embodiment in FIG. 1 and FIG. 2.

FIG. 7 shows a flow diagram 710 of how additional memory may be accessed through a switch fabric, 131, 248, according to an embodiment. Components of the embodiments on FIG. 1 and FIG. 2 will be used to illustrate the flow diagram on FIG. 7 but other configurations are contemplated. For purposes of illustration and not limitation, the first processor, 112, 218, controls the access to an additional memory, 140, 250, but it is also possible for the second processor, 114, 236, to control access to the additional memory, 140, 250. The control may happen through a memory controller, 120, 222, or through a device such as a demand functional controller 318 (discussed below) but other configurations are contemplated.

In operation 712, the first processor, 112, 218, may be assigned an additional memory, 140, 250. The assignment may occur automatically or may depend on additional memory, 140, 250, being requested by the first processor, 112, 218. In operation 714, the second processor, 114, 236, may determine its memory requirements. In operation 715, the second processor, 114, 236, may monitor the total memory requirements of the second processor, 114, 236. If the amount of memory, 130, 224, coupled to the second processor 114, 236, is less than the memory required, then the second processor 114, 236, may not need to access additional memory, 140, 250.

In operation 716, the second processor, 114, 236, may determine that it needs access to the additional memory, 140, 250, and may request access from the first processor, 112, 218, to the additional memory, 140, 250, through the switch fabric, 131, 248.

In operation 718, the first processor, 112, 218, may monitor the usage of the additional memory, 140, 250 to determine if the additional memory, 140, 250, is being used by either the first processor, 112, 218. In operation 718, the first processor, 112, 218, may determine if all or part of the additional memory, 140, 250, is required by the first processor, 112, 218. For example, if the additional memory, 140, 250, is distributed between processors in part, where a particular processor may access part of the additional memory, 140, 250, then the first processor, 112, 218, may determine if any part of the additional memory, 140, 250, is available for use. If the additional memory, 140, 250, is distributed between particular processors as a whole, then the first processor, 112, 218, may determine if the additional memory, 140, 250, as a whole is available for use. If the first processor, 112, 218, requires the additional memory, 140, 250, then the first processor, 112, 218, may handle operation 720 according to the embodiment in FIG. 8. After operation 720 completes, the second processor, 114, 236, may determine whether it still requires additional memory, 140, 250, access in operation 715.

If the first processor, 112, 218, doesn't require access to the additional memory, 140, 250, then operation 722 takes place. In operation 722, the first processor, 112, 218, may deselect 134, 246 the switching device 132, 232 and give access of the additional memory, 140, 250, to the second processor, 114, 236. The access of the additional memory, 140, 250, may be given to the second processor, 114, 236, in whole or in part. For example, in the embodiment shown in FIG. 2, it may be possible for switching devices 232a, 232b to be used by the first processor 218 and switching devices 232c, 232d used by the second processor 236.

The first processor, 112, 218, may have direct access to the additional memory, 140, 248, and may act in a control fashion. In the shown embodiment, data from the second processor, 114, 236, may go through the first processor, 112, 218, for the additional memory, 140, 250, access. For example, when the second processor, 114, 236, reads data from the additional memory, 140, 250, the data may pass through the first processor, 112, 218, and the switch fabric, 131, 248. Likewise, the data may be written from the second processor, 114, 236, to the additional memory, 140, 250, by passing through the first processor, 112, 218, and the switch fabric, 131,248.

The second processor, 114, 236, may use the additional memory, 140, 250, until operation 724 is completed. When operation 724 is completed, the second processor, 114, 236, may communicate completion with the first processor, 112, 218, through the switch fabric, 131, 248.

Figure 9:
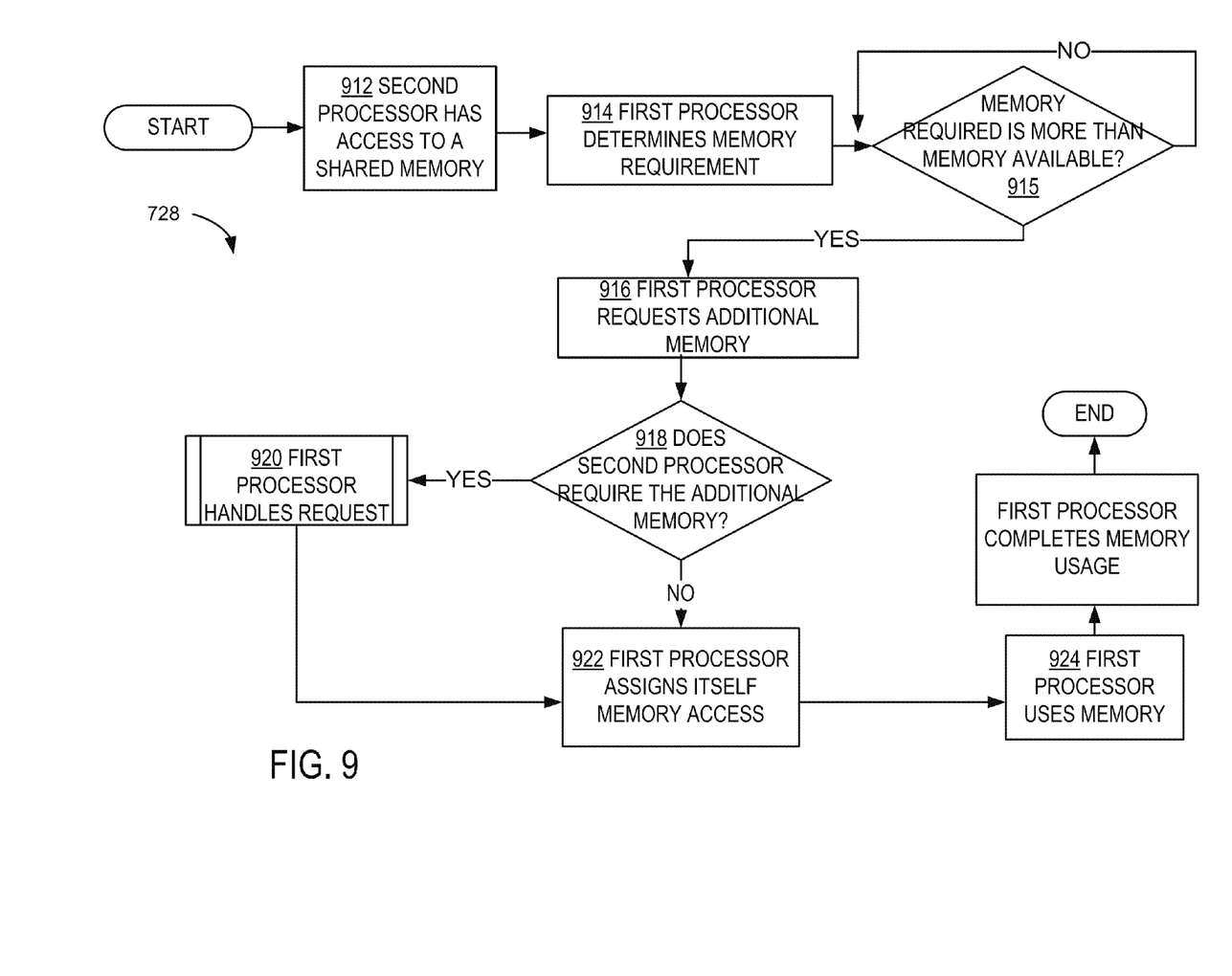
FIG. 9 shows a flowchart of the operation of selection of additional memory by a first processor from a second processor in FIG. 7.

Operation 728 is further described in the embodiment in FIG. 9. In operation 728, the first processor, 112, 218, may select the switching device 132, 232 to revert back to the control of the additional memory, 140, 250.

Figure 8:
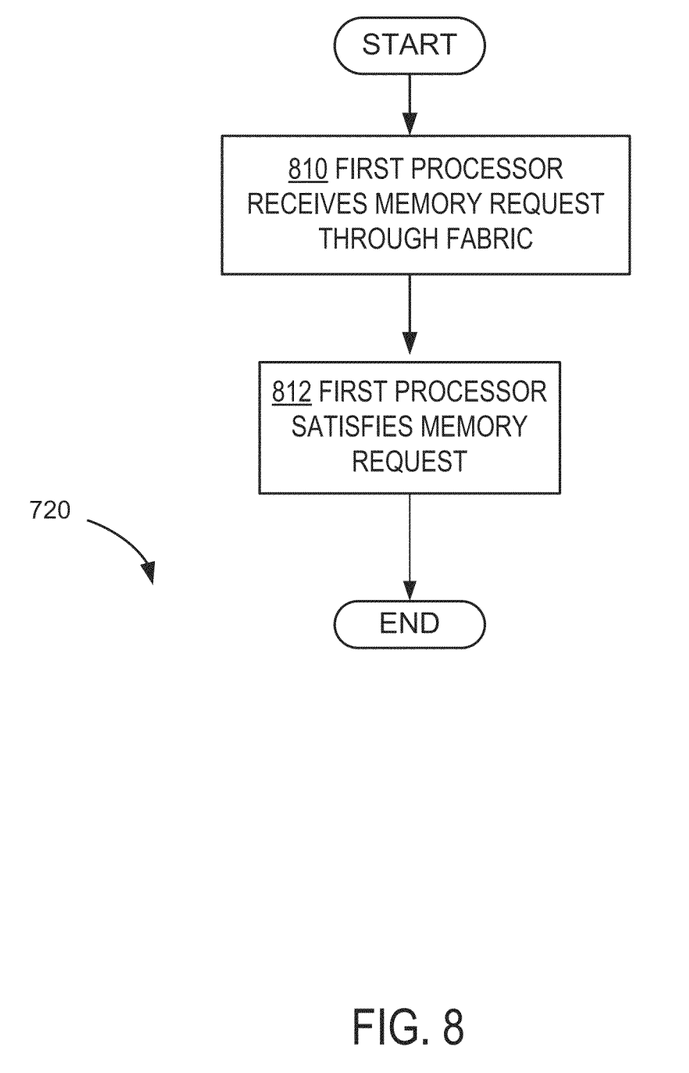
FIG. 8 shows a flowchart of the operation of the embodiment in FIG. 7.

FIG. 8 shows a flow diagram 720 of how the first processor, 112, 218, may handle a memory request from the second processor, 114, 236, for additional memory access, 140, 250, according to an embodiment. In operation 810, the first processor, 112, 218, may receive the memory request for the additional memory, 140, 250, from the second processor, 114, 236, through the switch fabric, 131, 248. In operation 812, the first processor, 112, 218, may satisfy the additional memory, 140, 250, request. In the shown embodiment, the first processor, 112, 218, may satisfy the memory request by waiting for the first processor, 112, 218 to finish using the additional memory, 140, 250, but other configurations are contemplated such as prioritization of additional memory, 140, 250, access.

FIG. 9 shows a flow diagram 728, of how the first processor, 112, 218, may access the additional memory, 140, 250, if the second processor, 114, 236, is using the additional memory, 140, 250, according to an embodiment. The embodiment on FIG. 9 may operate in a similar manner to the embodiment on FIG. 10. The first processor, 112, 218, may control access to the additional memory, 140, 250 and may communicate with the second processor, 114, 236, to ensure that the second processor, 114, 236, is finished using the additional memory, 140, 250.

In operation 912, the second processor, 114, 236, may be using the additional memory, 140, 250, in a manner similar to operation 728 in FIG. 7. In operation 914, the first processor, 112, 218, may determine its memory requirements. If the amount of memory, 124, 230, coupled to the processor 112, 218, is less than the memory required, then the processor 112, 218, may not need to access additional memory, 140, 250.

In operation 916, the first processor, 112, 218, may determine that it needs access to the additional memory, 140, 250, and may ensure that the additional memory, 140, 250, is not used by the second processor, 114, 236. In operation 918, the first processor, 112, 218, may determine if any additional memory, 140, 250, is required by the second processor, 114, 236. In operation 918, the first processor, 112, 218, may monitor the additional memory, 140, 250, to ensure that the second processor, 114, 236, is not using the additional memory, 140, 250. If the second processor, 114, 236, is using the additional memory, 140, 250, then the first processor, 112, 218, may handle operation 920 according to the embodiment in FIG. 10. After operation 920 completes, the first processor, 112, 218, may select the additional memory, 140, 250, in operation 922.

If the second processor, 112, 218, doesn't require access to the additional memory, 140, 250, then the process proceeds to operation 922. In operation 922, the first processor, 112, 218, may select 134, 246 the switching device 132, 232 and give access of the additional memory, 140, 250, to itself. The access of the additional memory, 140, 250, may be given to the first processor, 112, 218, in whole or in part similar to the embodiment on FIG. 7.

The first processor, 112, 218, may use the additional memory, 140, 218, until the operation 924 is completed 926. After operation 924 is completed at operation 926, the first processor, 112, 218, may wait for a request for additional memory, 140, 250, from either the second processor, 114, 236, or from itself in operation 716.

Figure 10:
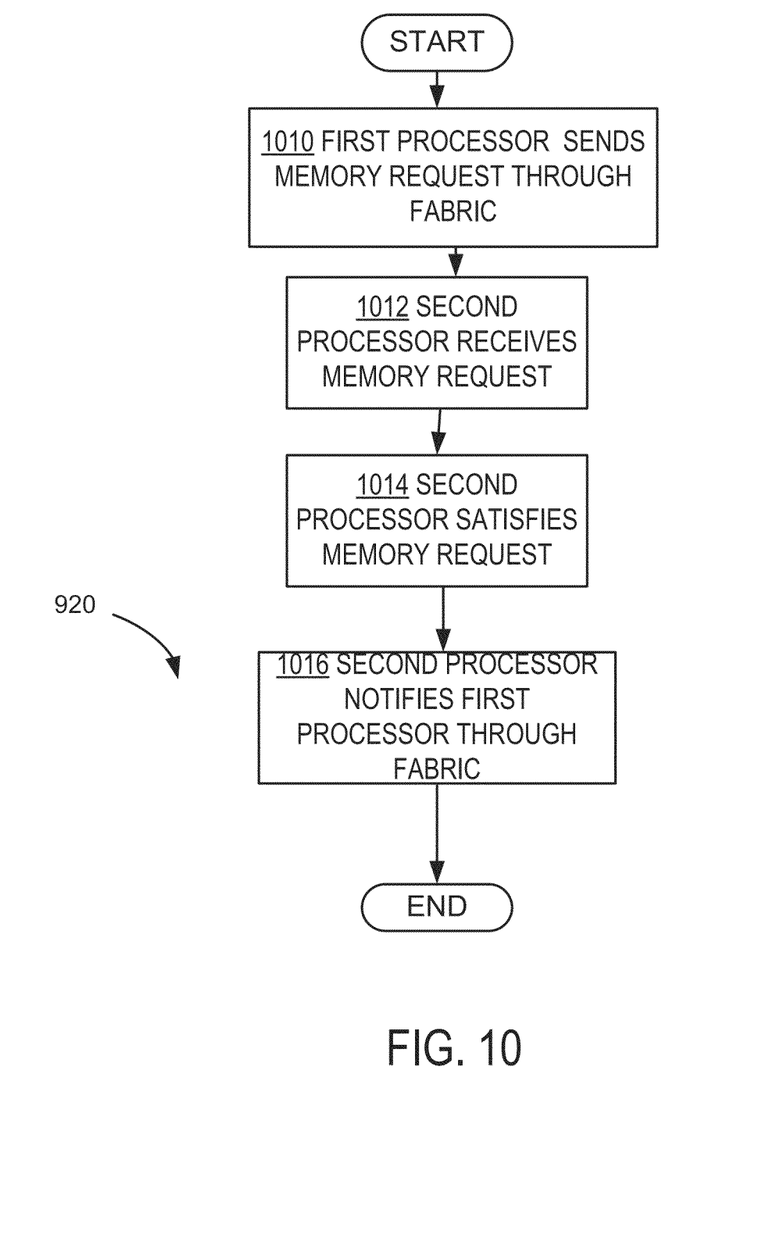
FIG. 10 shows a flowchart of the operation of the embodiment in FIG. 9.

FIG. 10 shows a flow diagram 920 of how the first processor, 112, 218, may handle requests for additional memory access, 140, 250, according to an embodiment. In operation 1010, the first processor, 112, 218, may signal the request for the additional memory, 140, 250, to the second processor, 114, 236, through the switch fabric, 131, 248. In operation 1012, the second processor, 114, 236, may receive the memory request. In operation 1014, the second processor, 114, 236, may satisfy the additional memory, 140, 250, request by completing use of the additional memory, 140, 250, but other configurations are contemplated. In operation 1016, the second processor, 114, 236, may notify the first processor, 112, 218, that the memory usage is complete so that the first processor, 112, 218, may proceed with operation 922 in FIG. 9.

Figure 3:
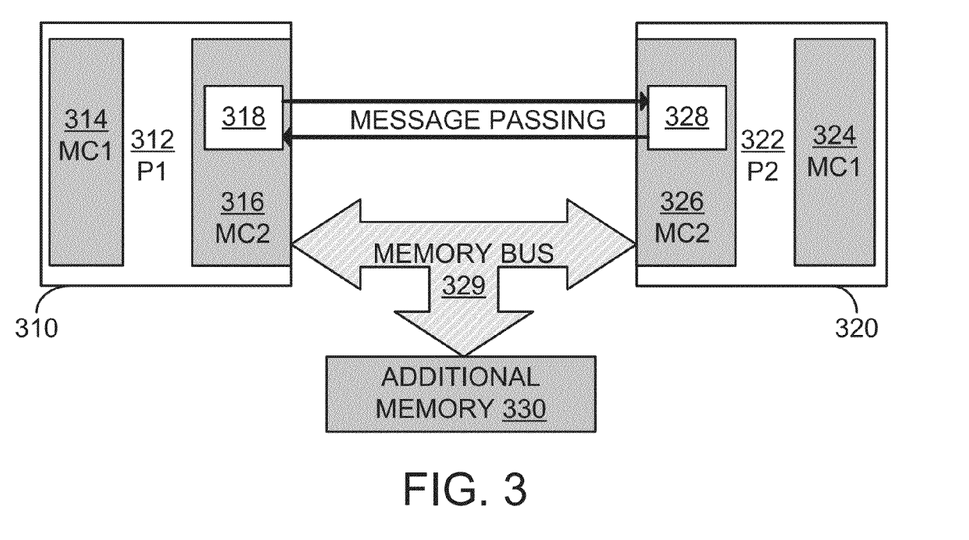
FIG. 3 shows a schematic representation of a top view of a demand function controller that controls access to additional memory according to an embodiment.

FIG. 3 shows an overview of accessing the additional memory between two processors according to an embodiment. FIG. 3 can be either the Single Chip Module of FIG. 1 or the Dual Chip Module of FIG. 2. The embodiment shown on FIG. 3 may have a first processor assembly 310 with a processor 312, a first memory controller 314, and a second memory controller 316. The second memory controller 316 may be coupled with a first Demand Function Controller (DFC) 318.

The embodiment may have a second processor assembly 320 with a second processor 322, a first memory controller 324, and a second memory controller 326. The second memory controller may also be coupled with a second DFC 328. The DFCs, 318, 328 may coordinate for memory access with each other. Both first memory controllers, 314, 324 may operate under the control of its respective processor, 312, 322 in a manner similar to the embodiments in FIG. 1 and FIG. 2. An aspect of the shown embodiment is that both second memory controllers, 316, 326, co-own the additional memory 330. During co-ownership of the additional memory 330, the DFCs, 318, 328, may perform message passing to arbitrate which one will control the memory bus 329. To determine which particular DFC controls the memory bus 329, a particular DFC may operate based on a system level policy that may take into account the amount of data to be used, the data usage of each processor, a time limit, a priority, or other parameter. For example, if both processors, 312, 322, request additional memory 330 simultaneously, and the first processor 312 requires 50% of the additional memory 330 and the second processor 322 requires 70% of the additional memory 330, then the first DFC 318 may acknowledge that the second processor 322 requires more additional memory 330. The first DFC 318 may subordinate its request to the second DFC 328. The second DFC 328 may grant itself access to the memory bus 329 and the additional memory 330.

Figure 4:
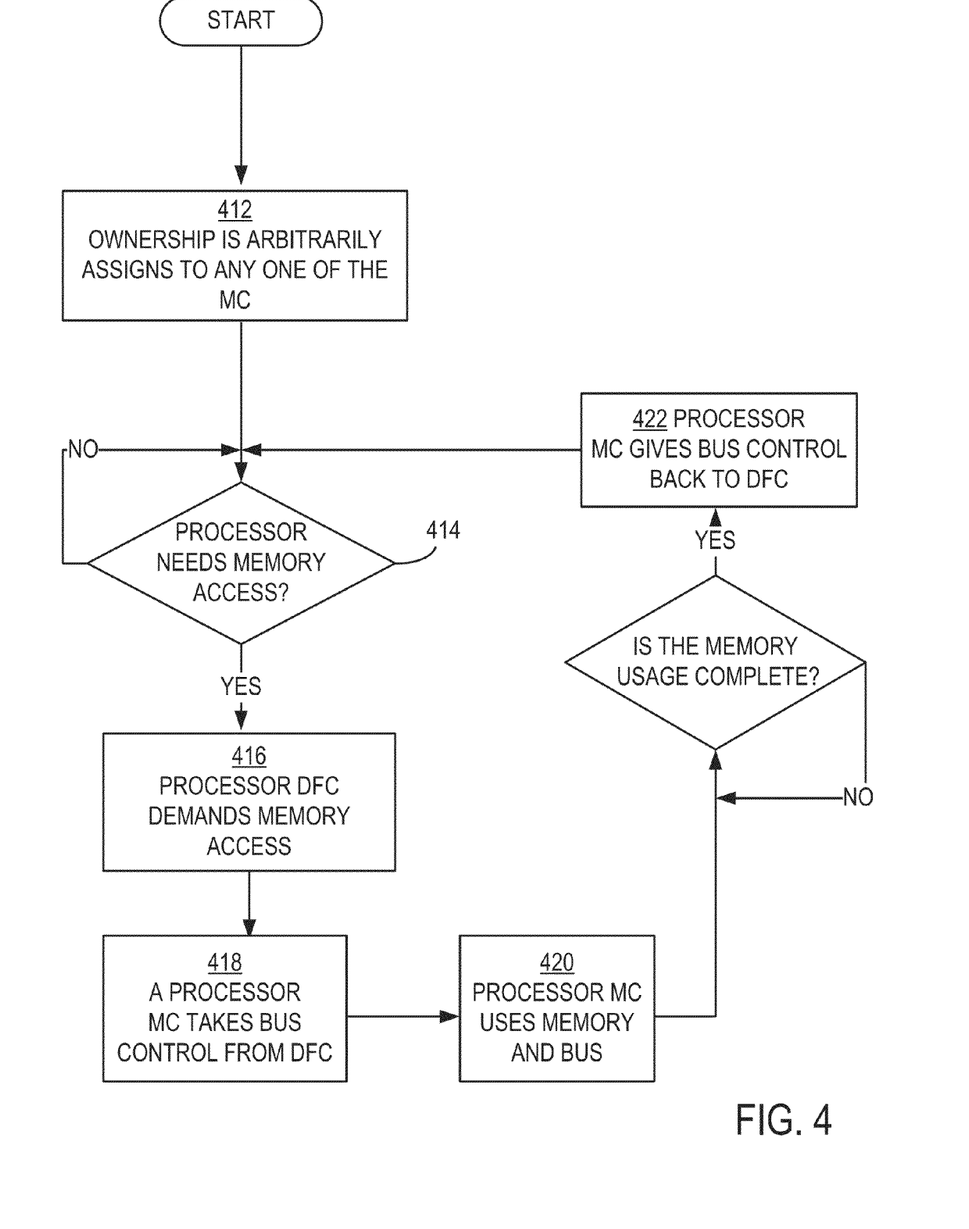
FIG. 4 shows a flowchart of the operation of the embodiment in FIG. 3.

FIG. 4 is a flow diagram of controlling access to additional memory with a DFC according to an embodiment. In operation 412, the ownership may be assigned arbitrarily. For purposes of illustration, the ownership of the additional memory 330 may be assigned arbitrarily to the second memory controller 316 on the first processor 312. The term memory controller may be shown as MC for brevity. The second memory controller 316 may have exclusive access to the additional memory 330 through the bus 329. In operation 414, the second processor 322 may analyze the memory demand from the first memory controller 324 to determine if the second processor 322 needs access to the additional memory 330. The memory demand may be determined by comparing the capacity of first memory controller 324 with the amount of memory being used by the first memory controller 324 but other configurations are contemplated. If access to the additional memory 330 is needed, the second processor 322 may access the DFC 328 on the second memory controller 326 in accordance with operation 416. The DFC 328 may directly signal the DFC 318 on the first processor 312.

In operation 418, the first processor 312 may release the bus 329 and have the DFC 318 signal the second processor DFC 328 that the bus 329 is free. The second processor DFC 328 may further signal the second memory controller 326 to access the bus 329. In operation 420, the second memory controller 326 may use the bus 329 until the memory usage is completed. In operation 422, the memory usage may be completed and the DFC 328 may give bus control back to first processor DFC 318.

Figure 5:
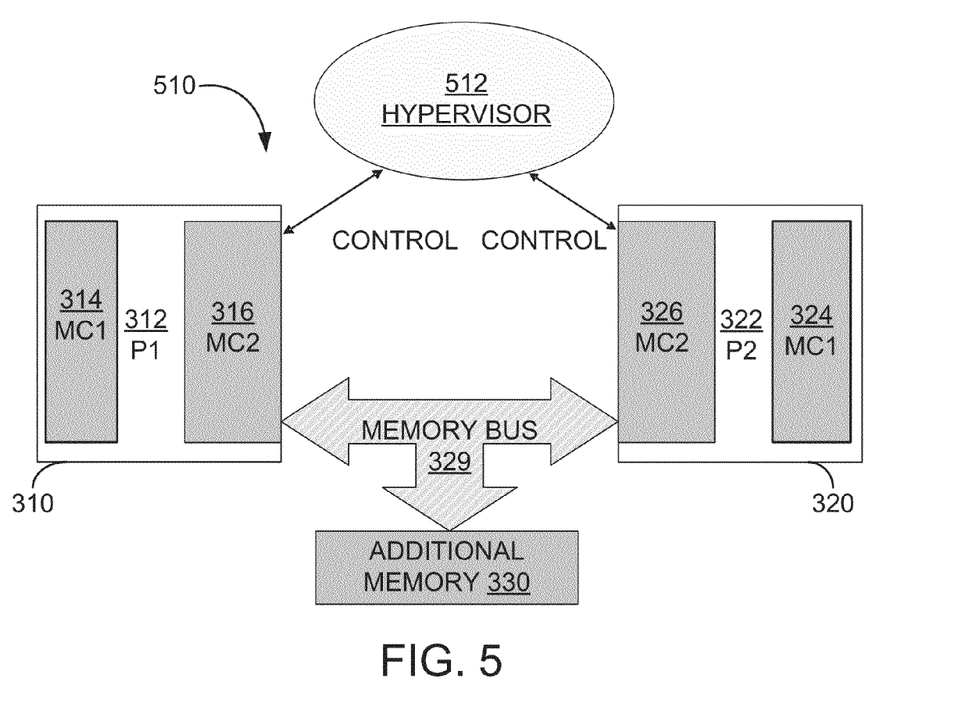
FIG. 5 shows a schematic representation of a top view of a Hypervisor mechanism controlling access to additional memory according to an embodiment.

FIG. 5 shows a dual-processor configuration with a hypervisor mechanism according to an embodiment. The system 510 may include processor assemblies, 310, 320, and an additional memory 330 arranged in a similar configuration to the embodiment shown in FIG. 3. The system 510 may also include a hypervisor mechanism (HYP) 512 that is coupled to both second memory controllers, 316, 326. The HYP 512 may coordinate access between the first and second processors, 312, 322, to the additional memory 330 through the memory bus 329.

Figure 6:
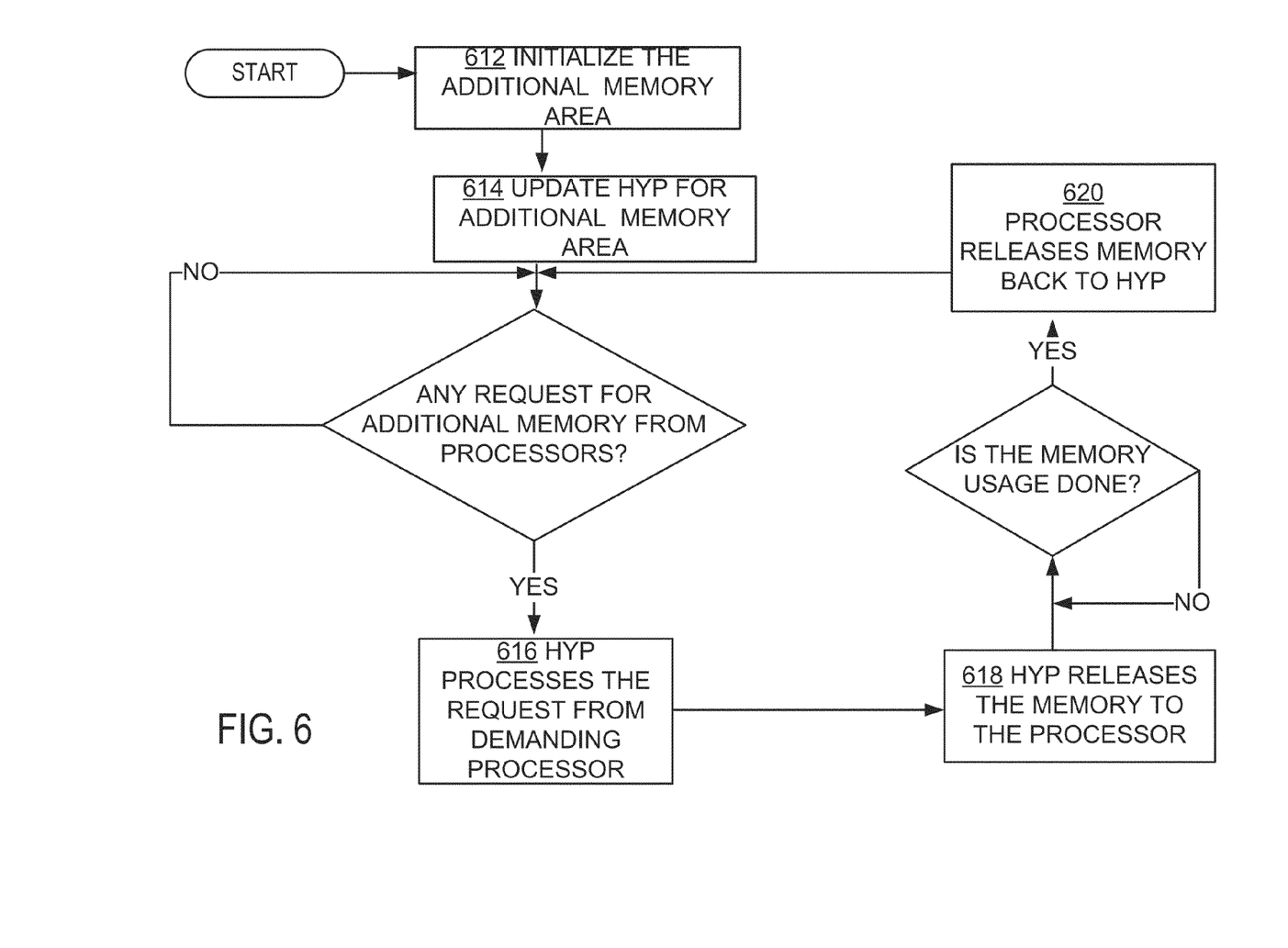
FIG. 6 shows a flowchart of the operation of the embodiment in FIG. 5.

FIG. 6 is a flow diagram of controlling access to additional memory with a hypervisor according to an embodiment. The term hypervisor mechanism may be shown as HYP for brevity and may also be referred to as hypervisor controller or hypervisor. In operation 612, the HYP 512 may initialize the additional memory area 330. In operation 614, the HYP 512 may be updated with the additional memory 330 information which may include which processor, 312, 322, has access to the additional memory. For purposes of illustration, the second processor 322 may require access to the additional memory in a similar manner to the embodiment on FIG. 4.

Once the processor 322 demands access to the additional memory 330, the HYP 512 may process the request from the processor 322 in operation 616. In operation 618, if there are no competing requests for the additional memory 330, then the HYP 512 may allow the second memory controller 326 to access the additional memory 330. If there is a competing request for the additional memory 330, for example, the first processor 312 also requires access to the additional memory 330, then the HYP 512 may consider which request to grant. In the shown embodiment, the granting of additional memory 330 access by the HYP 512 may be done by prioritizing the requests on a first-come, first-served basis but other configurations are contemplated such as prioritizing based on a time limit, a task, a size, a utilization, or other parameter to ensure that the additional memory 330 access is distributed evenly between the processors, 312, 322. The parameter may be predefined or created on-the-fly but other configurations are contemplated. The HYP 512 may monitor to see if the additional memory 330 usage is completed. When the second processor 322 has completed the memory usage, the second memory controller 326 may signal the HYP 512 that additional memory 330 usage is complete. In operation 620, the HYP 512 may further signal the memory controller 326 to release the additional memory bus 329.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope and spirit of the disclosed subject matter.

What is claimed is:

1. A method of coupling additional memory to a plurality of processors, comprising:
   determining memory requirements for each processor of the plurality of processors in a system;
   comparing the memory requirements of each processor of the plurality of processors to an available memory assigned to each processor of the plurality of processors; and
   selecting a processor from the plurality of processors that requires additional memory capacity beyond the assigned available memory of the processor from the plurality of processors to couple to the additional memory, wherein:
   selecting the processor occurs by signaling a switching device with a controller, wherein signaling the switching device includes giving exclusive use of the additional memory to the processor from the plurality of processors, and
   the operation of giving exclusive use of the additional memory includes limiting a duration of the exclusive use based on parameters.

2. The method of claim 1, wherein the operation of selecting the processor occurs by selecting the processor from the plurality of processors to access a portion of the additional memory and selecting another processor from the plurality of processors to access another portion of the additional memory.

3. The method of claim 1, wherein the controller includes a hypervisor mechanism.

4. The method of claim 1, wherein the controller includes a demand functional controller, wherein the demand functional controller coordinates memory access with another demand functional controller, and wherein the demand functional controller co-own the additional memory.

5. The method of claim 1, wherein the parameters include additional memory utilization of the processor from the plurality of processors, a time limit, and a size of an additional memory request.

6. The method of claim 1, wherein limiting the duration includes monitoring a usage of the additional memory by another processor from the plurality of processors, and releasing the additional memory when the processor from a plurality of processors completes usage of the additional memory.

7. The method of claim 1, wherein the parameters are selected from the group consisting of: the amount of data to be used, the data usage of each processor, a time limit, or a priority.

8. The method of claim 4, wherein, during co-ownership of the additional memory by the demand functional controllers, the demand functional controller performs message passing to arbitrate which of the demand functional controllers controls the memory bus.

9. A method of sharing additional memory between a first processor and a second processor, comprising:
   assigning a first processor an additional memory;
   determining the memory requirement of the second processor;
   determining if the memory requirement of the second processor is greater than the available memory;
   requesting, upon a determination that the memory requirement is greater than the available memory, access to the additional memory from the first processor; and
   assigning the second the additional memory.

10. The method of claim 9, wherein the requesting access to the additional memory, includes:
    requesting, through a switch fabric, access by the second processor; and
    evaluating the request based on one or more parameters.

11. The method of claim 10, wherein the parameters are selected from the group consisting of: the amount of data to be used, the data usage of each processor, a time limit, or a priority.

12. The method of claim 9, wherein the additional memory is accessible to both the first processor and the second processor.

* * * * *